US007417972B2

(12) United States Patent
Dillinger et al.

(10) Patent No.: US 7,417,972 B2
(45) Date of Patent: Aug. 26, 2008

(54) METHOD AND SYSTEM FOR TRANSMITTING DATA AND FOR DETERMINING THE TRANSMISSION PROPERTIES IN A RADIO COMMUNICATIONS SYSTEM

(75) Inventors: Markus Dillinger, München (DE); Juergen Schindler, Berlin (DE); Egon Schulz, München (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 1026 days.

(21) Appl. No.: 10/149,787

(22) PCT Filed: Dec. 15, 2000

(86) PCT No.: PCT/DE00/04485

§ 371 (c)(1),
(2), (4) Date: Jun. 17, 2002

(87) PCT Pub. No.: WO01/45274

PCT Pub. Date: Jun. 21, 2001

(65) Prior Publication Data

US 2002/0181411 A1    Dec. 5, 2002

(30) Foreign Application Priority Data

Dec. 15, 1999    (DE)    ................ 199 60 545

(51) Int. Cl.
*H04Q 7/00*    (2006.01)
*H04B 7/22*    (2006.01)
*H04L 27/00*    (2006.01)
*G01R 13/00*    (2006.01)
*G01R 29/26*    (2006.01)

(52) U.S. Cl. ................ 370/332; 370/328; 370/329; 370/337; 370/347; 375/295; 702/69
(58) Field of Classification Search ............ 370/310, 370/321, 442, 508, 510, 498
See application file for complete search history.

(56) References Cited

U.S. PATENT DOCUMENTS

| 5,323,446 | A | * | 6/1994 | Kojima et al. | ............... 455/437 |
| 5,663,957 | A | * | 9/1997 | Dent | ........................ 370/347 |
| 5,732,073 | A | * | 3/1998 | Kusaki et al. | ............... 370/280 |
| 5,752,164 | A | | 5/1998 | Jones | |
| 5,884,145 | A | * | 3/1999 | Haartsen | .................... 455/63.2 |
| 6,532,223 | B1 | * | 3/2003 | Sakoda et al. | ............... 370/337 |
| 6,574,211 | B2 | * | 6/2003 | Padovani et al. | ............ 370/347 |
| 6,639,908 | B1 | * | 10/2003 | Silventoinen et al. | ....... 370/345 |
| 6,967,943 | B1 | * | 11/2005 | Hamalainen et al. | ........ 370/347 |

FOREIGN PATENT DOCUMENTS

| EP | 0 996 306 A2 | 4/2000 |
| EP | 1 037 489 A2 | 9/2000 |
| JP | 10-70501 | 3/1998 |

* cited by examiner

*Primary Examiner*—Edan Orgad
*Assistant Examiner*—Blanche Wong
(74) *Attorney, Agent, or Firm*—Staas & Halsey LLP

(57) ABSTRACT

A possibility for transmitting data via a radiolink with a timeslot structure in a radiocommunications system is described, measurement data for determining the transmission characteristics of the radiolink being inserted within the timeslot structure in dependence on the variation with time of the transmission characteristics of the radiolink between the base station and the terminal at the subscriber end in the timeslot structure.

17 Claims, 3 Drawing Sheets

| D1 Payload | MA Measurement | D2 Payload | GP Control |

# METHOD AND SYSTEM FOR TRANSMITTING DATA AND FOR DETERMINING THE TRANSMISSION PROPERTIES IN A RADIO COMMUNICATIONS SYSTEM

CROSS REFERENCE TO RELATED APPLICATIONS

This application is based on and hereby claims priority to PCT Application No. PCT/DE00/04485 filed on Dec. 15, 2000 and German Application No. 199 60 545.9 filed on Dec. 15, 1999, the contents of which are hereby incorporated by reference.

BACKGROUND OF THE INVENTION

The present invention relates to a method and an arrangement for transmitting data and for examining the transmission characteristics in a radio communications system.

In radio communications systems, data like signaling data, voice data or other user data are transmitted with the aid of electromagnetic waves via a radio interface between the transmitting and the receiving device, at least in a part-area of the communications system. An example of current radio communications networks are networks according to the GSM standard and with a TDMA transmission method which are operated at carrier frequencies of 900, 1800 or 1900 MHz. Another example are future radio communications systems such as UMTS which is based on a CDMA, TD/CDMA or TDD transmission method and uses carrier frequencies in the range of approx. 200 MHz. The data to be transmitted are transmitted at these carrier frequencies between base stations of the communications system at the network end and mobile or stationary terminals at the subscriber end.

Special radio communications systems are those which have a time slot structure. As a rule, the timeslots are combined in timeslot frames which, in turn, can be part of a higher-level frame structure. Examples of such radio communications systems with a timeslot structure are TDMA, TDD, TD/CDMA, TD/SDCDMA and FDD systems. In the case of a GSM system, for example, eight timeslots are combined in one timeslot frame. Each individual timeslot has a duration of 0.577 ms and the complete timeslot frame has a duration of about 4.6 ms.

In a TDD system in UMTS, in contrast, a timeslot frame has 16 timeslots which in each case have a duration of 625 µs. The complete timeslot frame has a duration of 10 ms. A part of the timeslots of a TDD timeslot frame is used for the uplink from the terminal at the subscriber end to the base station and the other part of the timeslots of the timeslot frame is used for the downlink from the base station to the terminal at the subscriber end. Between the timeslots of the uplink and the downlink, at least one switching point is inserted which can be shifted within the timeslot frame in order to provide for an asymmetric allocation of the timeslots to the uplink and to the downlink.

Within a timeslot, a data block or burst is transmitted with a particular predefined structure. Apart from payload data, the data block can also contain other data which are necessary or useful for the transmission of the payload data. Thus, for example, control or signaling data or particular measurement data such as, for example, for determining the transmission characteristics can be provided in these data blocks.

A major aim in radio communications systems is to provide the subscribers with the highest possible measure of comfort. In particular, the best possible quality of data transmission is to be guaranteed to the subscribers, on the one hand and, on the other hand, the highest possible data rate is to be provided by corresponding transmission capacity. These requirements represent an increasing problem especially with regard to the continuously growing numbers of subscribers in radio communications systems.

SUMMARY OF THE INVENTION

Therefore, one object is to provide a possibility for transmitting data and for determining transmission characteristics in a radio communications system which allows for the best possible quality of the data transmission and, at the same time, high transmission capacity.

In the method for transmitting data via a radiolink with a timeslot structure in a radio communications system with at least one base station and at least one terminal at the subscriber end, measurement data for determining the transmission characteristics of the radiolink are provided within the timeslot structure. The measurement data are inserted into the timeslot structure in dependence on the variation with time of the transmission characteristics of the radiolink between the base station and the terminal at the subscriber end.

Thus, it is not necessary to continuously provide a particular set of the data, which can be transmitted altogether via the radiolink, for measurements of the transmission characteristics. Instead, the measurement data are inserted into the timeslot structure in accordance with the individual situations of the respective radiolink. If it can be seen that the individual situations of the radiolink are barely changing, a continuous transmission of measurement data for continuous checking of the transmission characteristics of the radiolink is not required. The volume of data necessary for the measurement data can thus be largely saved and provided for other data such as payload data or signaling data. This provides an increase in transmission capacity of the radio communications system without significantly impairing the quality of the radiolink.

It is possible to transmit one or more channels between the base station and the terminal over the radiolink between the base station and the terminal. Correspondingly, the determination of the transmission characteristics and the insertion or saving of measurement data dependent thereon can take place on the same channel or one channel can be used for determining the transmission characteristics and measurement data can be saved on one or more other channels in dependence thereon. The latter makes sense, e.g. if the surveying of a channel, for example of a signaling channel, already provides information on the transmission characteristics on the other channels, for example on traffic channels.

The transmission characteristics of the radiolink between the base station and the terminal at the subscriber end can be influenced by different quantities. Thus, the quality or the propagation times of the radiolink can change due to different factors. Examples of quantities influencing the radiolink which can vary with time and can thus affect a variation with time of the transmission characteristics are the location of the terminal at the subscriber end, namely in the case of a mobile terminal which can move at a particular relative speed with respect to the base station, or also external disturbances of the radiolink such as, for example, by meeting with other radiolinks or by shading due to moving objects such as, for example, passing vehicles. It can be provided for the variation with time of the quantities which influence the transmission characteristics to be determined in order to insert or save measurement data in dependence on the variation with time of these quantities.

If the variation with time of the location of the terminal at the subscriber end, in particular, is considered and particularly the relative speed between the base stations and the terminal at the subscriber end, it can be provided that measurement data are inserted into the timeslot structure when the relative speed exceeds a predetermined limit speed. As a result, the situation can be reached where basically no measurement data need to be transmitted during an existing radiolink especially in the case where terminals are not moving or moving only slowly. At particular times, however, measurement data can be transmitted once or several times in order to determine the transmission characteristics of the radiolink at least once. In particular, such a measurement can be made preferably at the beginning of a radiolink. This insertion of measurement data at the beginning of a radiolink can also be provided as standard for all other cases of radiolinks which are influenced by quantities which are variable with time. In this arrangement, the measurement data are inserted into a predetermined number of timeslots but in all other timeslots, measurement data are only inserted in dependence on the variation with time of the transmission characteristics or of the quantities influencing them.

In particular, it can be provided that the measurement data are inserted into an increasing number of timeslots of the timeslot structure with increasing variation with time of the transmission characteristics of the radiolink, particularly due to an increasing variation with time of the quantities influencing the transmission characteristics. The result is that the determination of the transmission characteristics is adapted to the extent of the variation with time of the transmission characteristics of the radiolink and it is possible to respond with a larger number of measurements to transmission characteristics which change more rapidly. Conversely, naturally, the measurement data can be inserted into a decreasing number of timeslots of the timeslot structure with a decreasing variation with time of the transmission characteristics of the radiolink or of the quantities influencing it.

Thus, if the influence on the radiolink with time decreases with time, the measurement data can be increasingly saved again and the released volume of data can be provided for other applications such as payload data or signaling data. In both cases, a certain hysteresis can be provided, i.e. the increased or reduced variation with time must have first stabilized over a particular period before the system responds with the insertion or saving of measurement data.

As already described above, the result is the interchangeability of measurement data, on the one hand, and payload data or signaling data, on the other hand. If a certain data area or a certain volume of data, respectively, is not needed for measurement data, it can be provided for payload data or signaling data as a result of which the transmission capacity of the radiolink can be increased. If it is found, however, that additional measurement data must be inserted into the timeslot structure, in order to be able to guarantee the quality of the link, for example, the measurement data are inserted into the timeslot structure instead of a particular part of the payload data or signaling data.

An arrangement for transmitting data via a radiolink with a timeslot structure is constructed for carrying out the method described above, the arrangement having devices for determining the variation with time of the transmission characteristics of the radiolink between the base station and the terminal at the subscriber end. These devices are coupled to devices for inserting measurement data into the timeslot structure.

A further subject is a radio communications system which exhibits at least one arrangement, described above, for transmitting data via a radiolink with a timeslot structure.

A base station for a radio communications system exhibits an arrangement, described above, for transmitting data via a radio link with a timeslot structure. In this case, it can be provided, for example, that the devices for determining the variation with time of the transmission characteristics are only constructed as evaluating devices which evaluate measurement results of another device, for example of a terminal at the subscriber end.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
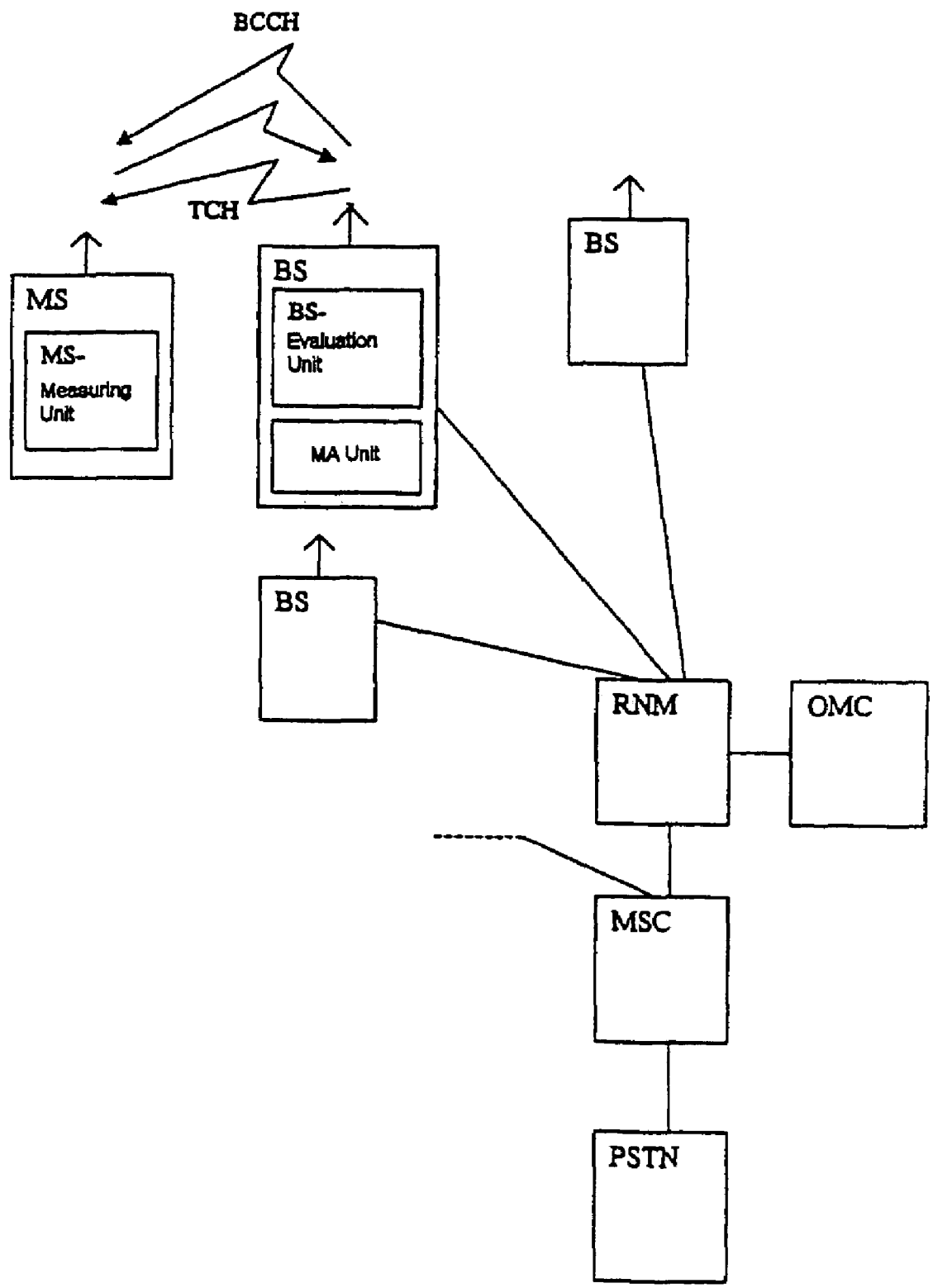
FIG. 1: shows a diagrammatic representation of a radio communications system according to the invention.

Reference will now be made in detail to the preferred embodiments of the present invention, examples of which are illustrated in the accompanying drawings, wherein like reference numerals refer to like elements throughout.

FIG. 1 shows a mobile radio system as an example of a radiocommunications system which exhibits a multiplicity of mobile switching centers MSC which are connected to one another and at least one of which forms an access to other communication networks such as, for example a landline network PSTN. In addition, the mobile switching centers MSC are connected to a device RNM for allocating resources in the mobile radio system to which various base stations BS are linked. Furthermore, the mobile radio system exhibits an operation and maintenance center OMC which is also connected to the RNM.

Apart from other functions, the base stations BS mainly exhibit a device for determining the transmission characteristics of radiolinks between the base station BS and the terminals MS at the subscriber end. In the present example, it is only constructed as an evaluating device since the actual measurement takes place at another location, namely in the terminal MS at the subscriber end. For this reason, the evaluating device of the base station BS is generally called BS Evaluation Unit in FIG. 1. The base station sends out a signaling channel BCCH (Broadcast Control Channel) which is detected and surveyed by the terminals at the subscriber end, for example by a mobile station MS. For this purpose, the terminal MS exhibits corresponding measuring devices which are generally called MS measuring unit in FIG. 1. Using these measuring devices, the terminal MS can determine the variation with time of the transmission characteristics of the radiolink. The corresponding results can be transmitted to the BS evaluation unit automatically or on request. In the base station, it would then be possible to determine, e.g. the relative speed between the terminal at the subscriber end and the base station from the results of the measurement. Depending on the results of the measurement, a device coupled to the BS measuring unit which is generally called the MA unit in FIG. 1, inserts measurement data MA (midamble) in a suitable form into the timeslot structure of a radiolink for the transmission of payload data. These payload data are transmitted on a separate channel, namely a traffic channel TCH. If it is found that the transmission characteristics of the radiolink scarcely change, the measurement data MA can be saved at least on the traffic channel, which data would be provided there as on the signaling channel BCCH.

Figures 2, 3:
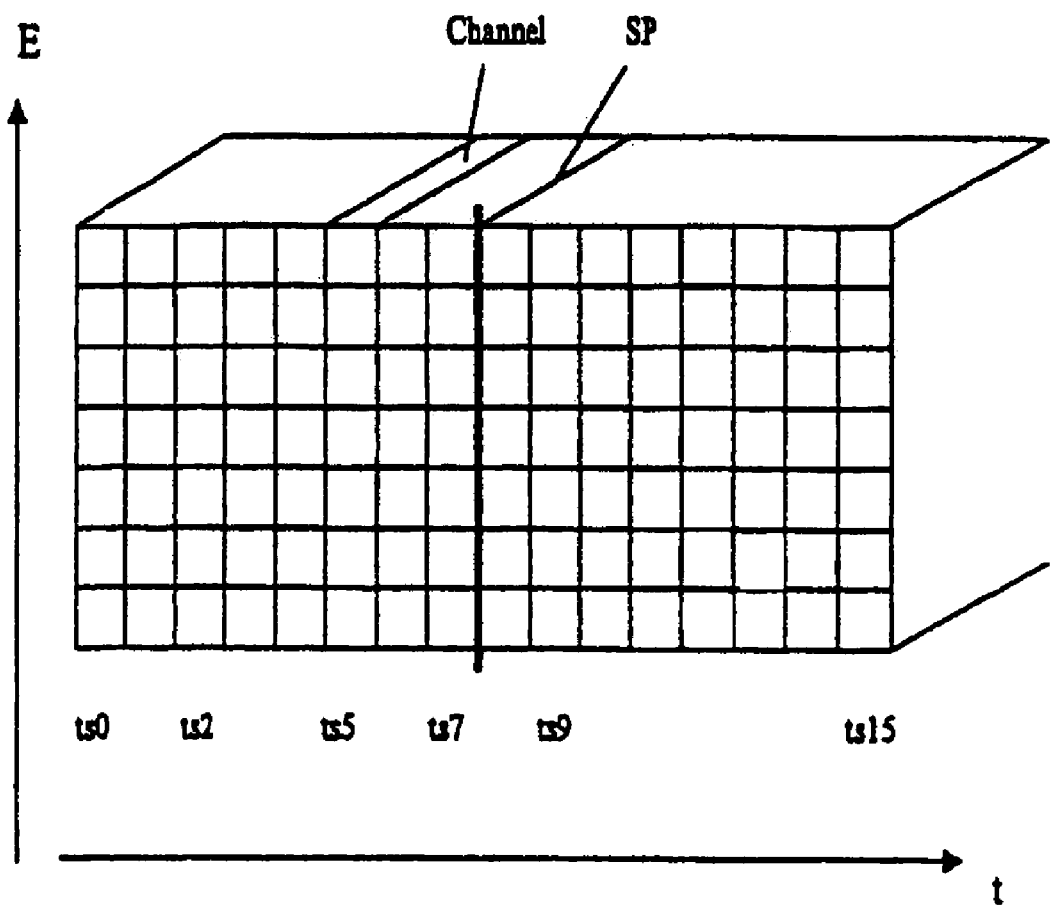
FIG. 2: shows a diagrammatic representation of a timeslot structure of a TDD system.
FIG. 3: shows a diagrammatic representation of a timeslot frame of the TDD system with measurement data.

FIG. 2 shows a timeslot structure of a TDD system in which a timeslot frame comprises 16 timeslots ts0 to ts15. In FIG. 1, the first eight timeslots ts0 to ts7 are allocated to the downlink and the remaining timeslots ts8 to ts15 after the switching point SP are allocated to the uplink. It is also possible to provide a number of switching points SP within such a timeslot frame and these switching points can be inserted into the timeslot frame at different locations.

FIG. 3 shows the structure of a data block (burst) which is transmitted within a timeslot.

This data block comprises a first set of payload data D1 followed by measurement data MA, a second set of payload data D2 and control data GP for checking an error-free transmission of the payload data.

If the corresponding measuring devices in the radiocommunications system find that the transmission characteristics of the radiolink between the base station BS and the terminal MS at the subscriber end or, respectively, the quantities influencing them change only little with time, it is possible largely to dispense with the measurement data within the individual timeslots at least of the traffic channel TCH of the corresponding radiolink. This situation is shown in the further figures.

Figure 4:
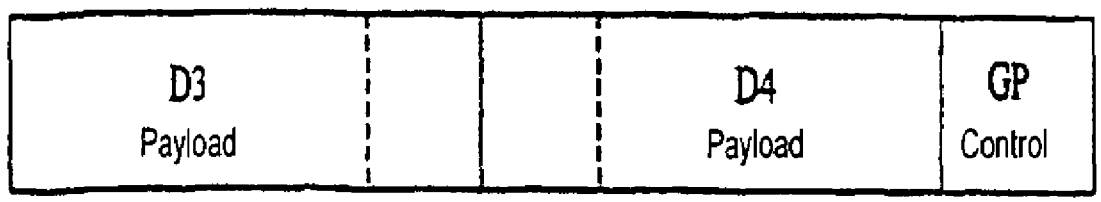
FIG. 4: shows timeslot frames according to FIG. 3 but with payload data instead of the measurement data.

FIG. 4 shows a data block in which further payload data are transmitted instead of the measurement data MA. Thus, it is possible to transmit greater volumes of payload data D3, D4 within this data block than in the data block according to FIG. 3.

Figure 5:
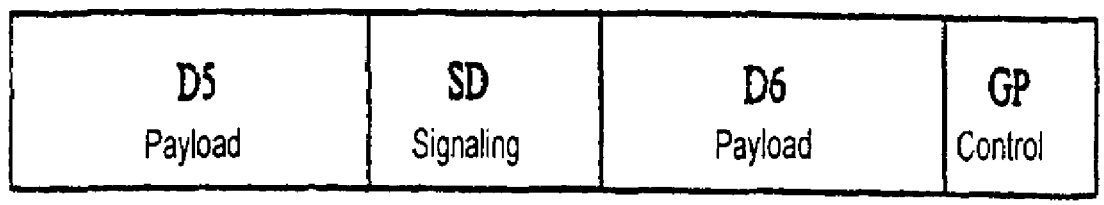
FIG. 5: shows timeslot frames according to FIG. 3 but with signaling data instead of the measurement data.

FIG. 5 shows an alternative to FIG. 4 where the measurement data of the data block from FIG. 3 have been replaced by additional signaling data SD which thus e.g. provide for in-band signaling.

As can be seen from FIGS. 4 and 5, the provision of measurement data within the timeslots of the corresponding link or at least in a part of the channels of the link can largely be dispensed with for the cases in which the transmission characteristics of the radiolink between the base station BS and the terminal MS or, respectively, the quantities influencing the transmission characteristics, change only a little as, for example, in the case of a mobile station MS which is moving only slowly or not at all. The consequence is a distinct increase in transmission capacity of the corresponding link.

The invention has been described in detail with particular reference to preferred embodiments thereof and examples, but it will be understood that variations and modifications can be effected within the spirit and scope of the invention.

The invention claimed is:

1. A method for transmitting data between a base station and at least one terminal via a radio connection with a timeslot structure in a radio communications system, comprising:
   determining how a speed of the terminal relative to an external disturbance of the radio connection varies with time;
   selectively inserting measurement data for determining transmission characteristics of the radio connection, the measurement data being selectively inserted into the timeslot structure depending on the variation with time of the speed of the terminal relative to the external disturbance of the radio connection;
   wherein the measurement data is selectively inserted such that an amount of measurement data inserted is reduced when the variation with time of the speed of the terminal relative to the external disturbance of the radio connection is reduced.

2. The method according to claim 1, wherein a property of the radio connection comprises the extent to which the signal quality of the radio connection varies with time.

3. The method according to claim 2, wherein the measurement data is selectively inserted such that an amount of measurement data inserted is reduced when the variation with time of the speed of the terminal relative to the external disturbance of the radio connection is relatively stable.

4. A method for transmitting data between a base station and at least one terminal via a radio connection with a timeslot structure in a radio communications system comprising:
   determining a variation with time of a speed of the terminal relative to an external disturbance of the radio connection; and
   selectively inserting measurement data for determining transmission characteristics into the timeslot structure, the insertion of the measurement data into the timeslot structure depending on the variation with time of the speed of the terminal relative to the external disturbance of the radio connection,
   wherein the measurement data are inserted into an increasing number of timeslots with an increasing variation with time of the speed of the terminal relative to the external disturbance of the radio connection.

5. The method of claim 4, wherein,
   a number of channels are provided for the radio connection and the determination of the transmission characteristics, and
   the measurement data and payload data are transmitted on a same channel.

6. The method of claim 4, wherein,
   a number of channels are provided for the radio connection and the determination of the transmission characteristics, and
   the insertion of the measurement data take place on different channels.

7. The method of claim 4, wherein the determination of the variation with time of the speed of the terminal relative to the external disturbance of the radio connection depends on the variation with time, of factors that influence the transmission characteristics.

8. The method of claim 7, wherein the measurement data are inserted into the timeslot structure in dependence on external disturbances of the radio connection between the base station and the terminal.

9. The method of claim 7, wherein the measurement data are inserted into the timeslot structure immediately after a data transmission speed between the base station and the terminal exceeds a predetermined data transmission speed.

10. The method of claim 4, wherein the measurement data are always inserted into a predetermined number of timeslots at the beginning of a radio connection.

11. The method of claim 4, wherein when the measurement data are inserted into the timeslots, the measurement data are inserted instead of payload data or signaling data.

12. The method of claim 4, wherein, the measurement data are inserted into the timeslots as a preamble or midamble.

13. A method for transmitting data between a base station and at least one terminal via a radio connection with a timeslot structure in a radio communications system comprising:

determining a variation with time of a speed of the terminal relative to an external disturbance of the radio connection; and selectively inserting measurement data for determining transmission characteristics into the timeslot structure, the insertion of the measurement data into the timeslot structure depending on the variation with time of the speed of the terminal relative to the external disturbance of the radio connection, wherein the measurement data are inserted into a decreasing number of timeslots with a decreasing variation with time of the speed of the terminal relative to the external disturbance of the radio connection.

14. A transmitter to transmit data between a base station and at least one terminal via a radio connection with a timeslot structure, comprising:

a device to determine how a speed of the terminal relative to an external disturbance of the radio connection varies with time; and a device to selectively insert measurement data for determining transmission characteristics of the radio connection, the measurement data being selectively inserted into the timeslot structure depending on the variation with time of the speed of the terminal relative to the external disturbance of the radio connection, wherein the measurement data are inserted into an increasing number of timeslots with an increasing variation with time of the speed of the terminal relative to the external disturbance of the radio connection.

15. A radio communications system comprising:
a base station;
at least one terminal;
a radio connection to carry data within a timeslot structure; and a transmitter to transmit the data, comprising:

a device to determine how a speed of the terminal relative to an external disturbance of the radio connection varies with time; and a device to selectively insert measurement data for determining transmission characteristics of the radio connection, the measurement data being selectively inserted into the timeslot structure depending on the variation with time of the speed of the terminal relative to the external disturbance of the radio connection, wherein the measurement data are inserted into an increasing number of timeslots with an increasing variation with time of the speed of the terminal relative to the external disturbance of the radio connection.

16. A base station to transmit data to at least one terminal via a radio connection with a timeslot structure, comprising:

a device to determine how a speed of the terminal relative to an external disturbance of the radio connection varies with time; and a device to selectively insert measurement data for determining transmission characteristics of the radio connection, the measurement data being selectively inserted into the timeslot structure depending on the variation with time of the speed of the terminal relative to the external disturbance of the radio connection, wherein the measurement data are inserted into an increasing number of timeslots with an increasing variation with time of the speed of the terminal relative to the external disturbance of the radio connection.

17. The base station as claimed in claim 16, wherein the device to determine receives the measurement data from the terminal.

* * * * *